(12) United States Patent
Bursell (10) Patent No.: US 11,341,247 B2
(45) Date of Patent: May 24, 2022

(54) USE OF A TRUSTED EXECUTION ENVIRONMENT AS A SAFE BUILD ENVIRONMENT

(71) Applicant: Red Hat, Inc., Raleigh, NC (US)

(72) Inventor: Michael H. M. Bursell, Farnborough (GB)

(73) Assignee: Red Hat, Inc., Raleigh, NC (US)

( * ) Notice: Subject to any disclaimer, the term of this patent is extended or adjusted under 35 U.S.C. 154(b) by 101 days.

(21) Appl. No.: 16/551,988

(22) Filed: Aug. 27, 2019

(65) Prior Publication Data
US 2021/0064755 A1 Mar. 4, 2021

(51) Int. Cl.
| G06F 21/57 | (2013.01) |
| H04L 9/08 | (2006.01) |
| G06F 8/41 | (2018.01) |
| H04L 9/30 | (2006.01) |

(52) U.S. Cl.
CPC ............ G06F 21/572 (2013.01); G06F 8/41 (2013.01); G06F 21/57 (2013.01); H04L 9/08 (2013.01); H04L 9/083 (2013.01); H04L 9/0861 (2013.01); H04L 9/30 (2013.01); H04L 9/3073 (2013.01); G06F 2221/033 (2013.01)

(58) Field of Classification Search
CPC ........ G06F 21/00; G06F 21/57; G06F 21/572; G06F 9/41; G06F 2221/033; G06F 8/41; H04L 9/08; H04L 9/083; H04L 9/0861; H04L 9/3073
See application file for complete search history.

(56) References Cited

U.S. PATENT DOCUMENTS

| 7,908,492 | B2 | 3/2011 | Bade et al. |
| 9,942,631 | B2 | 4/2018 | Herdrich et al. |
| 10,255,413 | B2* | 4/2019 | Gaur ...................... G06F 21/57 |
| 2007/0047735 | A1* | 3/2007 | Celli ..................... H04L 9/0825 380/30 |
| 2016/0188873 | A1* | 6/2016 | Smith .................. H04L 9/3247 726/22 |
| 2018/0101677 | A1 | 4/2018 | Broumas et al. |
| 2018/0124064 | A1 | 5/2018 | Schrecker et al. |
| 2018/0157550 | A1* | 6/2018 | Ivanov ............... G06F 11/0712 |
| 2019/0116038 | A1 | 4/2019 | Sprague |
| 2019/0180006 | A1* | 6/2019 | Bojjireddy ............. G06F 21/53 |
| 2019/0220601 | A1* | 7/2019 | Sood ...................... G06F 21/57 |
| 2020/0167157 | A1* | 5/2020 | Hintermeister ......... H04L 67/34 |
| 2020/0272737 | A1* | 8/2020 | Ji ........................... G06F 21/57 |

OTHER PUBLICATIONS

Author Unknown, "TVEE: Trusted Virtual Execution Environment," Products and Technologies, trustkernal.com/en/products/tae, accessed May 2, 2019, Shanghai Pingbo info Tech Co. Ltd., 4 pages.
Choi, Joseph, et al., "Secure Multiparty Computation and Trusted Hardware: Examining Adoption Challenges and Opportunities," Review Article, Security and Communication Networks, vol. 2019, Article 1368905, Apr. 2, 2019, 29 pages.
Tempesta, Stefano, "Protect Your Data with Azure Confidential Computing," MSDN Magazine Blog, Feb. 2019, vol. 34, Issue 2, 14 pages.

* cited by examiner

Primary Examiner — Alexander Lagor
Assistant Examiner — D'Arcy Winston Straub
(74) Attorney, Agent, or Firm — Withrow & Terranova, PLLC (57) ABSTRACT

Use of a trusted execution environment (TEE) as a safe build environment. A build task is initiated in a TEE of a compute instance. The build task generates a first software component.

20 Claims, 7 Drawing Sheets

USE OF A TRUSTED EXECUTION ENVIRONMENT AS A SAFE BUILD ENVIRONMENT

BACKGROUND

The use of third-party cloud computing environments reduces the need for a company to have a substantial capital investment in computing hardware, operations employees, expensive equipment rooms, and the like, and have accordingly become increasingly popular.

SUMMARY

The examples disclosed herein utilize a trusted execution environment (TEE) as a safe build environment to minimize the exposure of highly confidential information during a software build process. In particular, one or more build tasks of a software build process are initiated into one or more TEEs. A TEE provides a hardware-implemented confidential environment that, by design, cannot be monitored or queried by a host operating system. Thus, even if the host operating system has been compromised, the host operating system cannot access the contents of the TEE. Accordingly, information inside a TEE, such as sensitive source code, cryptographic keys, or the like, cannot be accessed by a malicious process that is executing on the host computing device that provides the TEE.

In one example a method is provided. The method includes initiating, in a first trusted execution environment (TEE) of a first compute instance, a first build task, and generating, by the first build task, a first software component.

In another example a system is provided. The system includes a first compute instance that includes a first memory and a first processor device coupled to the first memory. The first processor device is to initiate, in a TEE of the first compute instance, a first build task, and generate, by the first build task, a first software component.

In another example a computer program product is provided. The computer program product is stored on a non-transitory computer-readable storage medium and includes instructions configured to cause a processor device to initiate, in a first TEE of a first compute instance, a first build task, and generate, by the first build task, a first software component.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

The use of third-party cloud computing environments (CCEs) reduces the need for a company to have a substantial capital investment in computing hardware, operations employees, expensive equipment rooms, and the like, and have accordingly become increasingly popular. While cloud computing environments have an interest in offering a secure computing environment for a customer, a customer may nevertheless be unwilling to perform certain actions in a third-party CCE because a security breach of the CCE would result in the release of highly-confidential information. Whether unintentional or the result of a malicious actor, such a security breach could be highly damaging, and the customer may have no practical way to determine the likelihood of such an event happening in the CCE, as well as no practical way to reduce the likelihood of such a security breach, since the computing devices in the CCE are owned and operated by a third party.

One activity that may involve highly confidential and sensitive information is a software build process of a software manufacturer. A software build process is a sequence of activities used to build a software package. A software build process may involve, for example, highly sensitive source code that is considered proprietary information, and which, if exposed to malicious actors, could be highly damaging to the software manufacturer and/or customers of the software manufacturer. A software build process may also utilize cryptographic information, such as symmetric cryptographic keys, or private keys of a private/public key pair that, if exposed to entities outside of the software manufacturer, would jeopardize the security and operation of the software.

The examples disclosed herein utilize a trusted execution environment (TEE) as a safe build environment to minimize the exposure of highly confidential information during a software build process. In particular, one or more build tasks of a software build process are initiated into one or more TEEs. A TEE provides a hardware-implemented confidential environment that, by design, cannot be monitored or queried by a host operating system. Thus, even if the host operating system has been compromised, the host operating system cannot access the contents of the TEE. Accordingly, information inside a TEE, such as sensitive source code, cryptographic keys, or the like, cannot be accessed by a malicious process that is executing on the host computing device that provides the TEE.

Figure 1A:
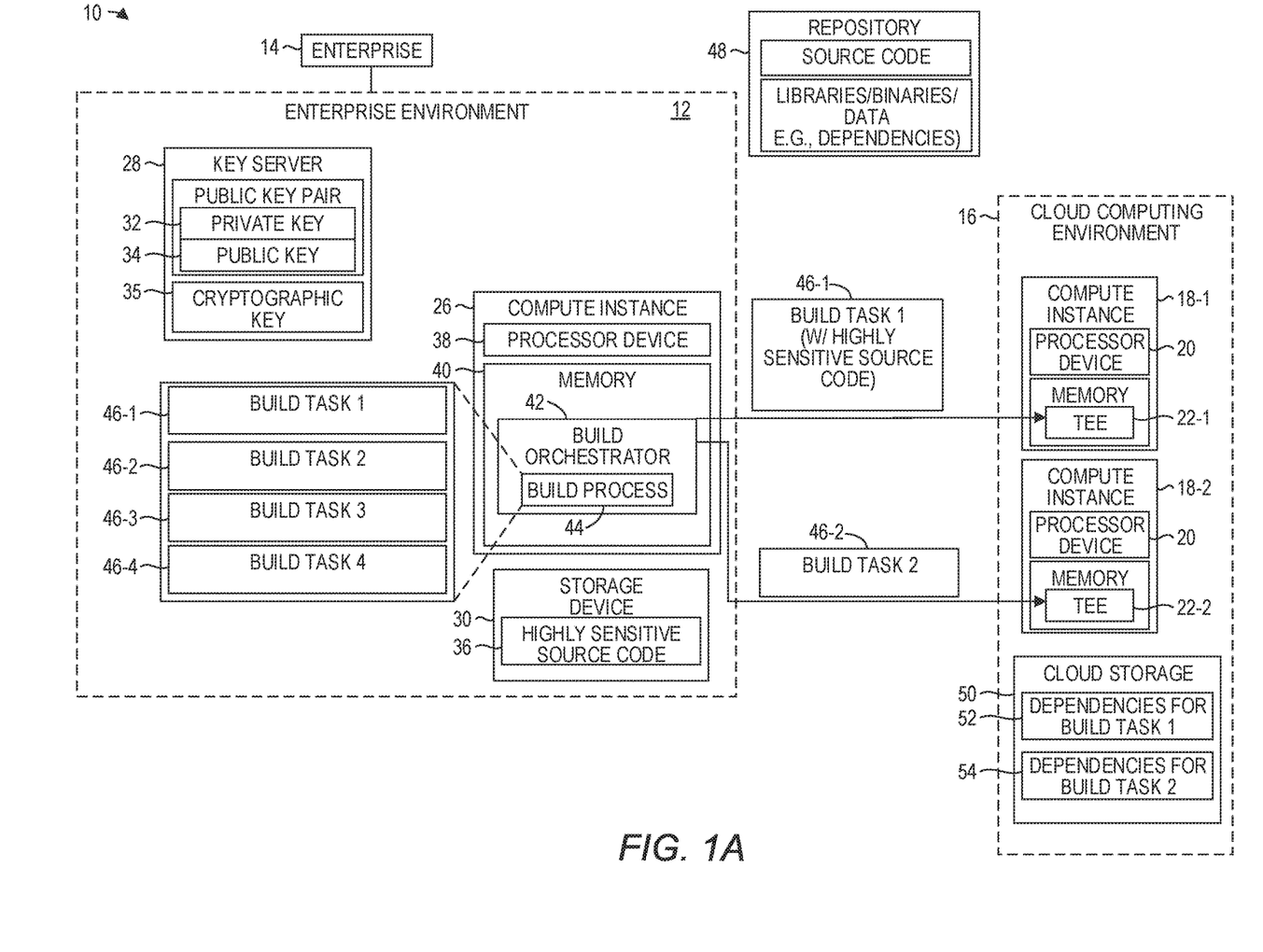
FIGS. 1A-1C are block diagrams of a system in which examples disclosed herein may be practiced.
Figure 1B:
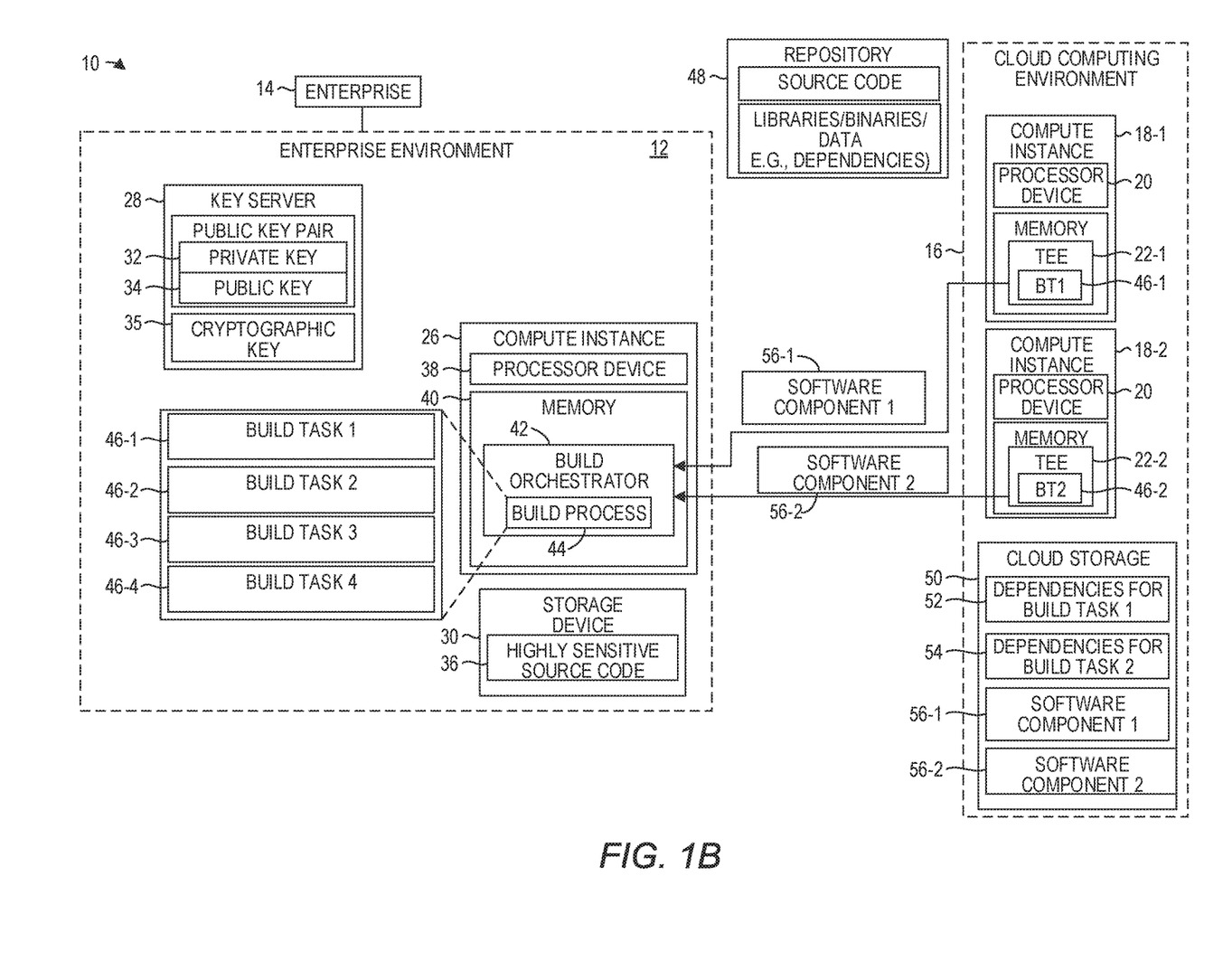
Figure 1C:
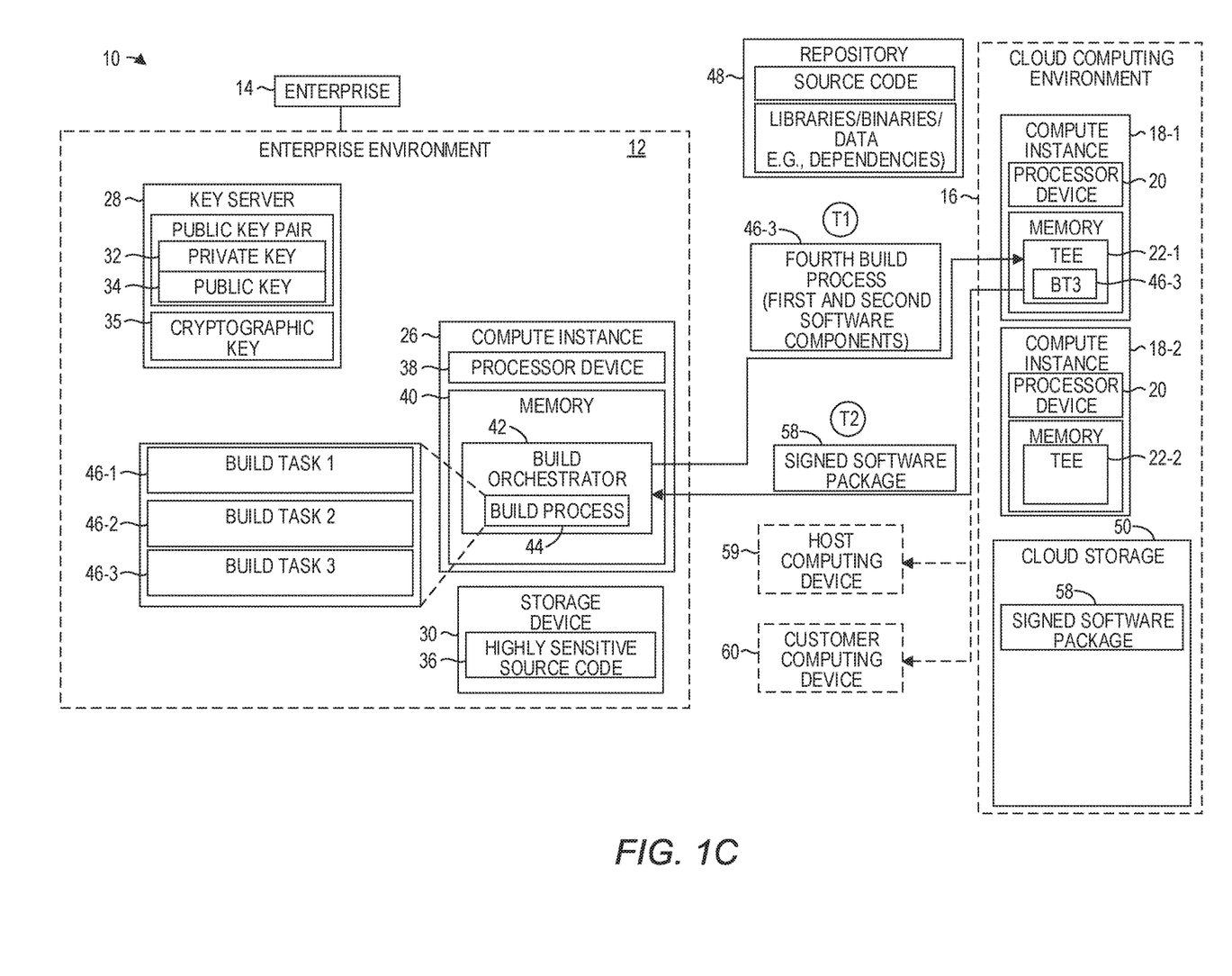

FIGS. 1A-1C are block diagrams of a system 10 in which examples disclosed herein may be practiced. Referring first to FIG. 1A, the system 10 includes an enterprise environment 12 associated with an enterprise 14 that utilizes a third-party cloud computing environment 16 to perform certain computing tasks, including the building of software packages for distribution to customers of the enterprise 14. It is noted that while the examples disclosed herein are discussed in the context of the cloud computing environment 16 for purposes of illustration, the examples are not in any way limited to cloud computing environments and have applicability in any environment in which it is desired to enhance security during a software build process.

The cloud computing environment 16 offers compute instances 18-1 and 18-2 for on-demand computing services as needed by customers of the cloud computing environment 16, such as the enterprise 14. As will be discussed in greater detail with regard to FIG. 3, the term "compute instance" refers to a discrete runtime environment, and may comprise a physical computing device configured to run an operating system, or may comprise a virtual machine executing on a computing device that emulates a physical computing device.

The compute instance 18-1 includes a processor device 20 that is capable of implementing a TEE 22-1. The TEE 22-1 is an environment implemented in part by the processor device 20 that provides a secure environment in which a computing process can execute. Computing processes executing in the TEE 22-1 cannot, by design, be queried or monitored by a host operating system of the compute instance 18-1. Examples of TEEs include Intel's® SGX TEE and AMD's® SeV TEE. The compute instance 18-2 also includes a processor device 20 that is capable of implementing a TEE 22-2.

The enterprise environment 12 includes a compute instance 26, a key server 28, and a storage device 30. The key server 28 contains a private key 32 and a public key 34 of a private/public key pair. The private key 32 may be used, for example, to sign software packages distributed by the enterprise 14 so that recipients of such software packages can ensure the authenticity of the software packages. The key server 28 also contains a symmetric cryptographic key 35 that may be used by software packages distributed by the enterprise 14 to encrypt information. The storage device 30 includes source code 36 that is highly sensitive and which should not be disclosed to external entities.

The compute instance 26 includes a processor device 38 and a memory 40. A build orchestrator 42 executes in the memory 40 and is configured to carry out actions identified in a build process 44. The build process 44 is a file, or an in-memory data structure, that contains data that the build orchestrator 42 uses to generate a software package. The data may include actions and parameters that identify the files and other information to use in the performance of the actions. In this example, the build process 44 comprises a plurality of build tasks 46-1-46-4, each of which defines one or more actions and parameters, such as data files and/or other information, used in the performance of the one or more actions. The build orchestrator 42 may comprise any build-automation utility, such as Make, Rake, Cake, MSBuild, Ant, Maven, Gradle and the like, modified as discussed herein.

It is noted that because the build orchestrator 42 is a component of the compute instance 26, functionality implemented by the build orchestrator 42 may be attributed to the compute instance 26 generally. Moreover, in examples where the build orchestrator 42 comprises software instructions that program the processor device 38 to carry out functionality discussed herein, functionality implemented by the build orchestrator 42 may be attributed herein to the processor device 38.

In this example, the build orchestrator 42 determines that the build task 46-1 involves the use of sensitive information and should therefore be initiated in a TEE, such as the TEE 22-1. The build orchestrator 42 sends the build task 46-1 to the compute instance 18-1 for initiation in the TEE 22-1. In this example, assume that the sensitive information is the source code 36 which is identified in the build task 46-1 as a source file that a compiler will use to generate an executable file. The build orchestrator 42 sends the build task 46-1 along with the source code 36 to the TEE 22-1 for execution. Because the source code 36 is retained in a memory of the TEE 22-1, neither the operating system of the compute instance 18-1 or any other task executing on the compute instance 18-1 can access the source code 36.

The build task 46-1, in the TEE 22-1, may first access a repository 48 and copy one or more dependencies, such as one or more of source code, libraries, binaries, or other data needed for the build task 46-1, from the repository 48 to a local cloud storage device 50 as dependencies 52. In other implementations, the build orchestrator 42 may have sent any needed dependencies along with the build task 46-1.

It is noted that because the build task 46-1 is a component of the compute instance 18-1, functionality implemented by the build task 46-1 may be attributed to the compute instance 18-1 generally. Moreover, in examples where the build task 46-1 comprises software instructions that program the processor device 20 to carry out functionality discussed herein, functionality implemented by the build task 46-1 may be attributed herein to the processor device 20.

The build orchestrator 42 also determines that the build task 46-2 involves the use of sensitive information and should therefore be initiated in a TEE, such as the TEE 22-2. The build orchestrator 42 sends the build task 46-2 to the compute instance 18-2 for initiation in the TEE 22-2. If the build tasks 46-1 and 46-2 are not dependent on one another, the build orchestrator 42 may send the build task 46-2 to the TEE 22-2 for execution even before the build task 46-1 has completed. The build task 46-2 also accesses the repository 48 and copies one or more dependencies, such as one or more of source code, libraries, binaries, or other data needed for the build task 46-2, from the repository 48 to the local cloud storage device 50 as dependencies 54. The build task 46-2 also accesses the key server 28 to obtain the cryptographic key 35. The cryptographic key 35 is contained in the memory of the TEE 22-2 and thus cannot be accessed by the operating system of the compute instance 18-2 or any other task executing on the compute instance 18-2.

Referring now to FIG. 1B, the build task 46-1 (BT1) in the TEE 22-1 generates an executable (i.e., binary code) software component 56-1 in the cloud storage 50 that is based at least in part on the source code 36. The build task 46-1 may, after the generation of the software component 56-1 (in, for example, the cloud storage 50), immediately discard the source code 36. The build task 46-1 may then send the software component 56-1, or a link to the software component 56-1, to the build orchestrator 42. The link may comprise, for example, location information that identifies the location of the software component 56-1, and which the build orchestrator 42 can use to obtain the software component 56-1. The build task 46-2 (BT2) in the TEE 22-2 generates an executable software component 56-2 (in, for example, the cloud storage 50) that contains the cryptographic key 35. The build task 46-2 may then send the software component 56-2, or a link to the software component 56-2, to the build orchestrator 42.

Referring now to FIG. 1C, the build orchestrator 42 receives the software components 56-1, 56-2, and determines that the build task 46-3 involves the use of sensitive information and should therefore be initiated in a TEE, such as the TEE 22-1, now that the build task 46-1 has completed. The build task 46-3 involves signing a completed software package that includes the software components 56-1, 56-2 with the private key 32 to authenticate the software package. At a time T1, the build orchestrator 42 sends the build task 46-3 and the software components 56-1, 56-2 to the compute instance 18-1 for initiation in the TEE 22-1. The build task 46-3 accesses the key server 28 to obtain the private key 32. The build task 46-3 packages the software components 56-1, 56-2 into a software package, and then signs the software package to generate a signed software package 58. At a time T2, the build task 46-3 sends the signed software package 58 to the build orchestrator 42 which may then, for example, distribute the signed software package 58 to one or more customers. In alternative implementations, the build task 46-3 may send the signed software package 58 directly to a host computing device 59 for installation and use in providing services to customers of the enterprise 14, or to a customer computing device 60 associated with a customer who licenses the software contained in the signed software package 58 from the enterprise 14.

Figure 2:
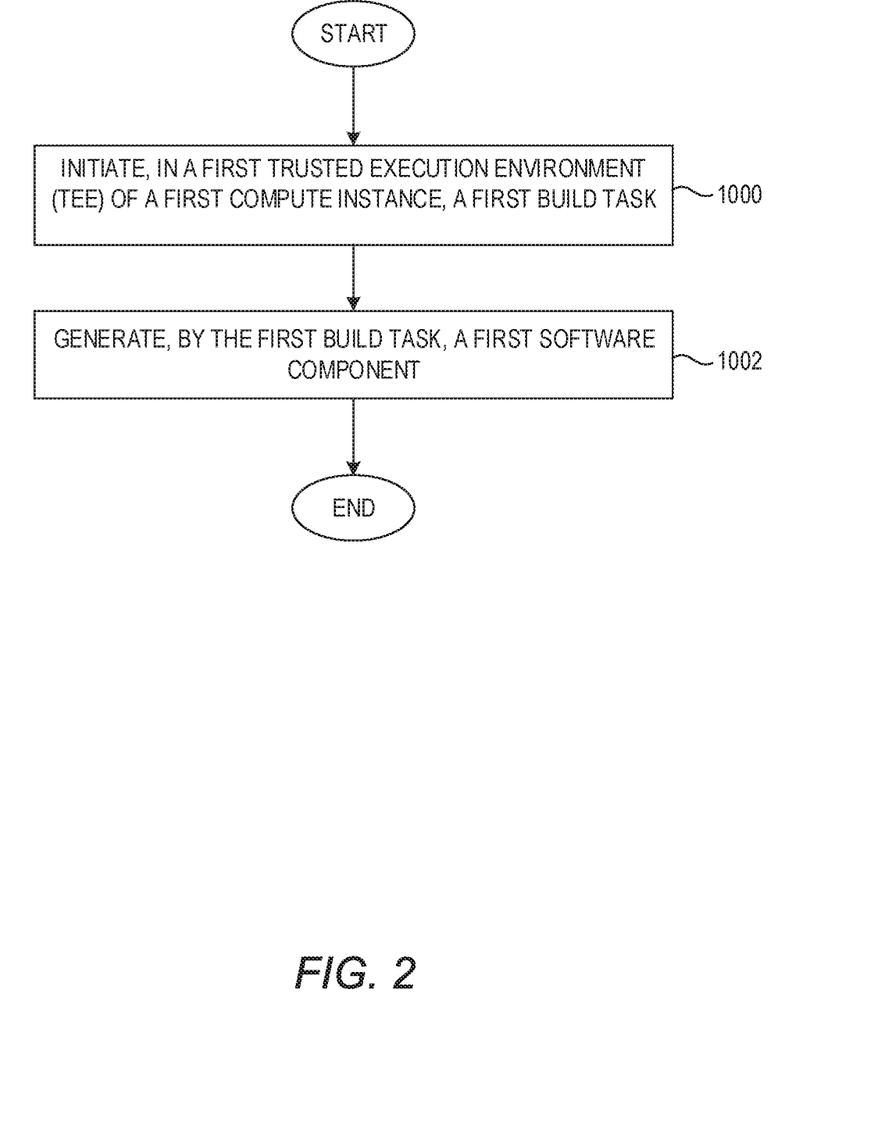
FIG. 2 is a flowchart of a process for using a trusted execution environment as a safe build environment according to one implementation.

FIG. 2 is a flowchart of a process for using a trusted execution environment as a safe build environment according to one implementation. FIG. 2 will be discussed in conjunction with FIG. 1B. The build orchestrator 42 initiates the build task 46-1 in the TEE 22-1 (FIG. 2, block 1000). The build task generates the software component 56-1 in the TEE 22-1 (FIG. 2, block 1002).

Figure 3:
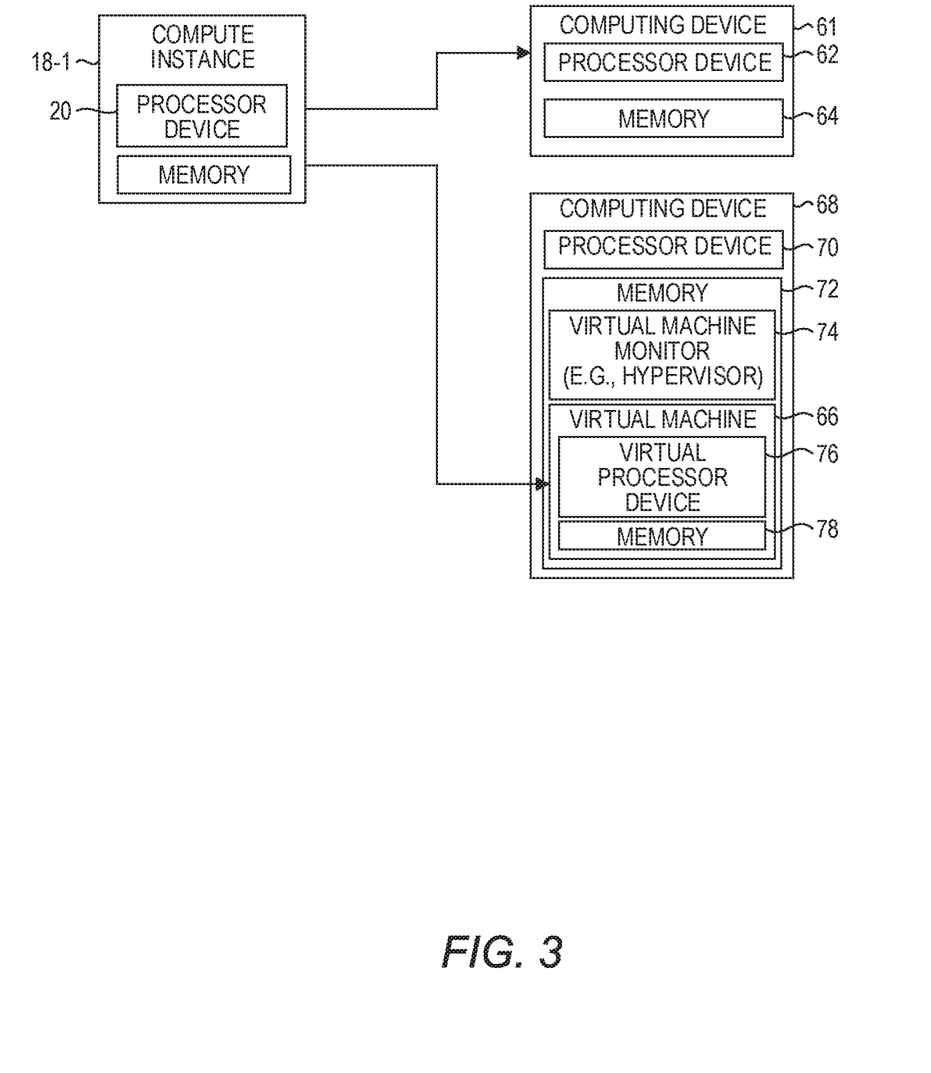
FIG. 3 is a block diagram illustrating various implementations of a compute instance.

FIG. 3 is a block diagram illustrating various implementations of the compute instance 18-1. In one implementation, the compute instance 18-1 comprises a "bare metal" host computing device 61 which includes a processor device 62 and a memory 64. The processor device 62 is a processor device capable of implementing a TEE. In another implementation, the compute instance 18-1 comprises a virtual machine 66 running on a host computing device 68. The host computing device 68 has a processor device 70 capable of implementing a TEE, and a memory 72. A hypervisor 74 may manage the virtual machine 66, and provide the virtual machine 66 a virtual processor device 76, which comprises a shared portion of the processor device 70, and a memory 78.

Figure 4:
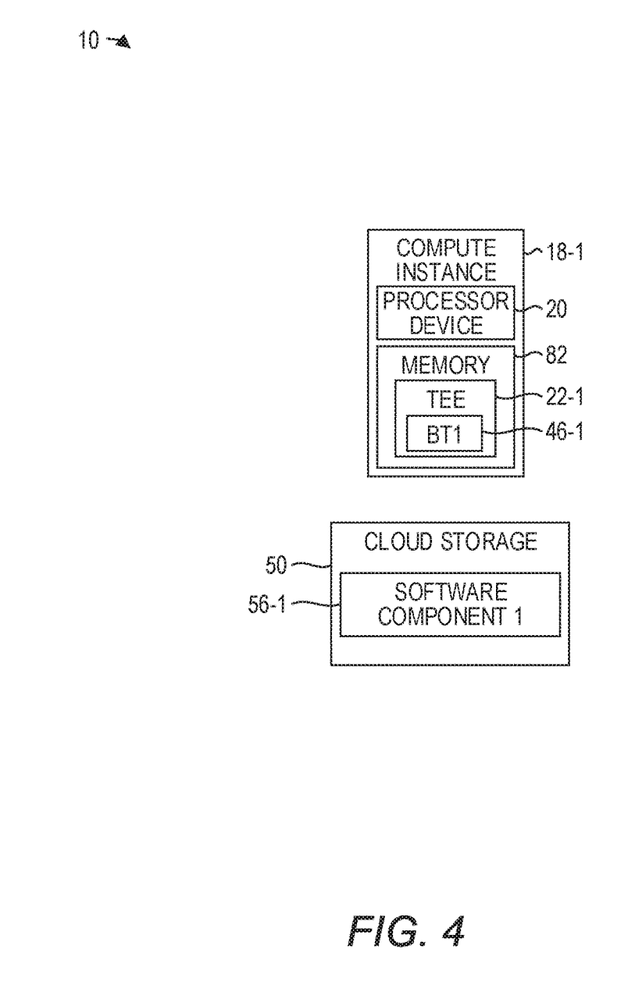
FIG. 4 is a simplified block diagram of the system illustrated in FIGS. 1A-1C according to one example.

FIG. 4 is a simplified block diagram of the system 10 illustrated in FIG. 1 according to one example. In this example, the system 10 includes the compute instance 18-1. The compute instance 18-1 includes a memory 82 and the processor device 20 coupled to the memory 82. The processor device 20 is to initiate, in the TEE 22-1 of the compute instance 18-1, the build task 46-1, and generate, by the build task 46-1, the software component 56-1.

Figure 5:
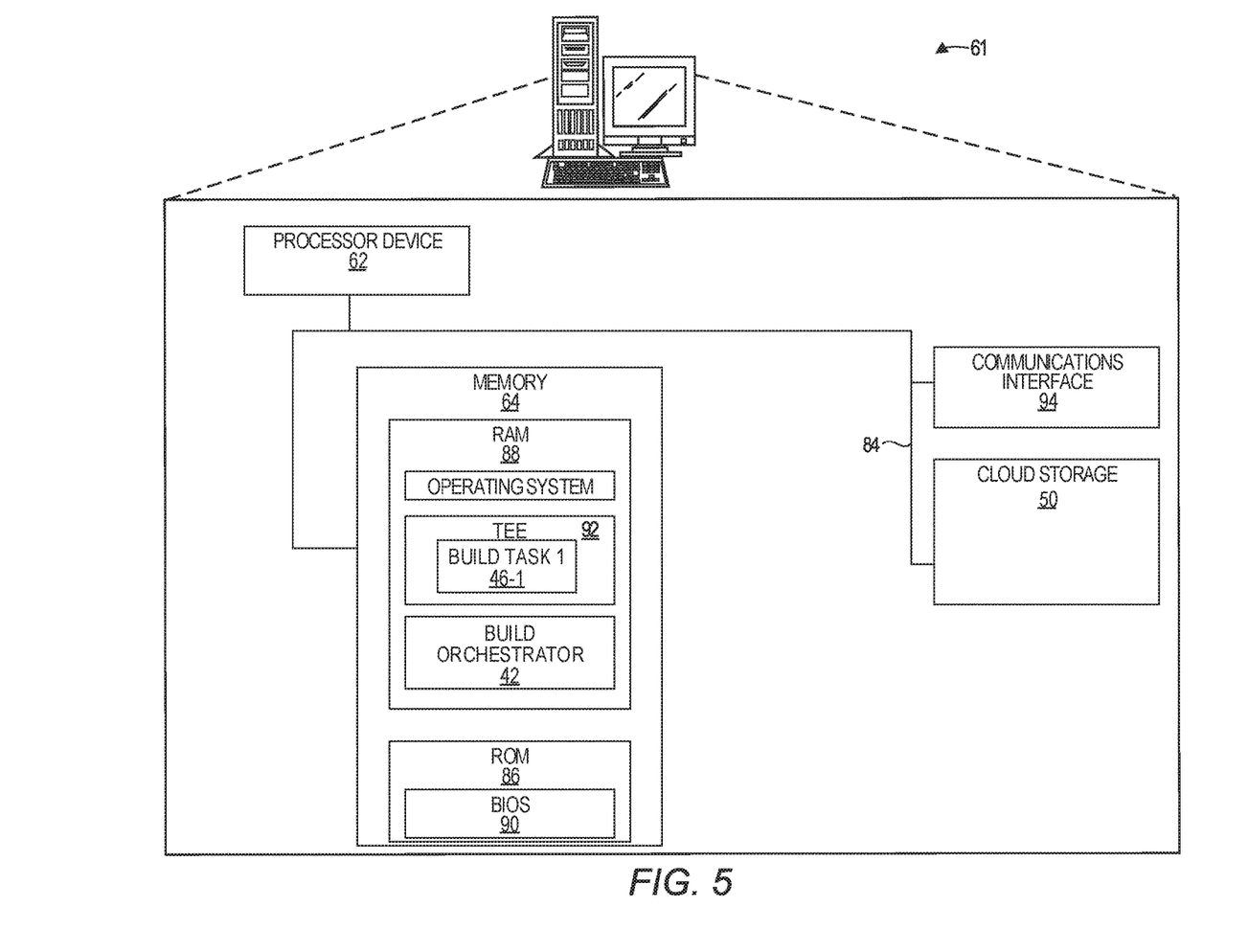
FIG. 5 is a block diagram of a computing device suitable for implementing a compute instance according to some implementations.

FIG. 5 is a block diagram of the computing device 61 suitable for implementing any of the compute instances discussed herein. The computing device 61 may comprise any computing or electronic device capable of including firmware, hardware, and/or executing software instructions to implement the functionality described herein, such as a computer server, a desktop computing device, a laptop computing device, or the like. The computing device 61 includes the processor device 62, the memory 64, and a system bus 84. The system bus 84 provides an interface for system components including, but not limited to, the system memory 64 and the processor device 62. The processor device 62 can be any commercially available or proprietary processor.

The system bus 84 may be any of several types of bus structures that may further interconnect to a memory bus (with or without a memory controller), a peripheral bus, and/or a local bus using any of a variety of commercially available bus architectures. The memory 64 may include non-volatile memory 86 (e.g., read-only memory (ROM), erasable programmable read-only memory (EPROM), electrically erasable programmable read-only memory (EEPROM), etc.), and volatile memory 88 (e.g., random-access memory (RAM)). A basic input/output system (BIOS) 90 may be stored in the non-volatile memory 86 and can include the basic routines that help to transfer information between elements within the computing device 61. The volatile memory 88 may also include a high-speed RAM, such as static RAM, for caching data.

The computing device 61 may further include or be coupled to a non-transitory computer-readable storage medium such as the cloud storage 50, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The cloud storage 50 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the cloud storage 50 and in the volatile memory 88, including an operating system and one or more program modules, such as the build orchestrator 42, and/or the build task 46-1 in a TEE 92, both of which may implement the functionality described herein in whole or in part.

All or a portion of the examples may be implemented as a computer program product stored on a transitory or non-transitory computer-usable or computer-readable storage medium, which includes complex programming instructions, such as complex computer-readable program code, to cause the processor device 62 to carry out the steps described herein. Thus, the computer-readable program code can comprise software instructions for implementing the functionality of the examples described herein when executed on the processor device 62.

An operator may also be able to enter one or more configuration commands through a keyboard, a pointing device such as a mouse (not illustrated), or a touch-sensitive surface such as a display device. The computing device 61 may also include a communications interface 94, such as an Ethernet transceiver, suitable for communicating with a network as appropriate or desired.

Individuals will recognize improvements and modifications to the preferred examples of the disclosure. All such improvements and modifications are considered within the scope of the concepts disclosed herein and the claims that follow.

What is claimed is:

1. A method comprising:
receiving, by a first compute instance of a cloud computing environment, a first build task of a build process, the build process comprising a plurality of build tasks to generate a software package comprising a plurality of executable software components;
initiating, in a first trusted execution environment (TEE) of the first compute instance, the first build task;
accessing, by the first build task in the first TEE, sensitive information associated with the first build task;
storing, by the first build task in the first TEE, the sensitive information within a memory of the first TEE, the sensitive information inaccessible to the first compute instance outside the first TEE;
generating, by the first build task in the first TEE, a first executable software component of the software package in the first TEE; and
after generating the first executable software component, discarding, by the first build task in the first TEE, the sensitive information.

2. The method of claim 1 further comprising sending the first executable software component or a link to the first executable software component to a build orchestrator.

3. The method of claim 2 wherein the build orchestrator executes on a second compute instance.

4. The method of claim 1 further comprising:
accessing, by the first build task, a cryptographic key; and
generating the first executable software component to include the cryptographic key.

5. The method of claim 4 wherein the first build task includes the cryptographic key.

6. The method of claim 5 further comprising:
accessing, by a build orchestrator executing on a second compute instance, the cryptographic key;
sending, by the build orchestrator, the first build task with the cryptographic key to the first compute instance for initiation in the first TEE.

7. The method of claim 4 further comprising requesting, by the first build task from a key server, the cryptographic key.

8. The method of claim 1 further comprising:
accessing, by the first build task, a private key of a private/public key pair; and
signing the first executable software component with the private key.

9. The method of claim 8 further comprising requesting, by the first build task from a key server, the private key.

10. The method of claim 1 further comprising:
wherein accessing, by the first build task in the first TEE, the sensitive information associated with the first build task further comprises:
accessing, by the first build task, a source code;
wherein generating, by the first build task in the first TEE, the first executable software component of the software package in the first TEE further comprises:
compiling, by the first build task, the source code to generate the first executable software component; and
wherein after generating the first executable software component, discarding, by the first build task in the first TEE, the sensitive information further comprises:
discarding the source code.

11. The method of claim 10 further comprising:
accessing, by a build orchestrator executing on a second compute instance, the source code;
sending, by the build orchestrator, the first build task with the source code to the first compute instance for initiation in the first TEE.

12. The method of claim 1 further comprising:
sending, by a build orchestrator executing on a second compute instance, the first build task to the first compute instance for initiation in the first TEE;
receiving, by the build orchestrator from the first build task, the first executable software component or a link to the first executable software component; and
combining, by the build orchestrator, the first executable software component with at least one other executable software component to generate a software package.

13. The method of claim 12 further comprising sending, by the build orchestrator, a second build task to a second TEE to generate the at least one other executable software component.

14. A system comprising:
a first compute instance comprising:
a first memory; and
a first processor device coupled to the first memory to:
receiving, by a first compute instance of a cloud computing environment, a first build task of a build process, the build process comprising a plurality of build tasks to generate a software package comprising a plurality of executable software components;
initiate, in a first trusted execution environment (TEE) of the first compute instance, the first build task;
accessing, by the first build task in the first TEE, sensitive information associated with the first build task;
storing, by the first build task in the first TEE, the sensitive information within a memory of the first TEE, the sensitive information inaccessible to the first compute instance outside the first TEE;
generate, by the first build task in the first TEE, a first executable software component of the software package in the first TEE; and
after generating the first executable software component, discarding, by the first build task in the first TEE, the sensitive information.

15. The system of claim 14 wherein the first processor device is further to:
access, by the first build task, a cryptographic key; and
generate the first executable software component to include the cryptographic key.

16. The system of claim 14 further comprising:
a second compute instance comprising:
a second memory; and
a second processor device coupled to the second memory to:
send, by a build orchestrator executing on the second compute instance, the first build task to the first compute instance for initiation in the first TEE;
receive, from the first build task, the first executable software component or a link to the first executable software component; and
combine the first executable software component with at least one other executable software component to generate a software package.

17. The system of claim 16 where the second processor device is further to send, by the build orchestrator, a second build task to a second TEE to generate the at least one other executable software component.

18. A computer program product comprising a non-transitory computer-readable storage medium and including instructions configured to cause a processor device to:
   receiving, by a first compute instance of a cloud computing environment, a first build task of a build process, the build process comprising a plurality of build tasks to generate a software package comprising a plurality of executable software components;
   initiate, in a first trusted execution environment (TEE) of the first compute instance, the first build task;
   accessing, by the first build task in the first TEE, sensitive information associated with the first build task;
   storing, by the first build task in the first TEE, the sensitive information within a memory of the first TEE, the sensitive information inaccessible to the first compute instance outside the first TEE;
   generate, by the first build task in the first TEE, a first executable software component of the software package in the first TEE; and
   after generating the first executable software component, discarding, by the first build task in the first TEE, the sensitive information.

19. The computer program product of claim 18 wherein the instructions further cause the processor device to:
   access, by the first build task, a cryptographic key; and
   generate the first executable software component to include the cryptographic key.

20. The computer program product of claim 18 wherein the instructions further cause the processor device to:
   access, by the first build task, a private key of a private/public key pair; and
   sign the first executable software component with the private key.

* * * * *